Oct. 4, 1966 E. R. WOOD 3,276,698
COMBINATION VALVE AND DIFFUSER UNIT
Filed Feb. 18, 1964
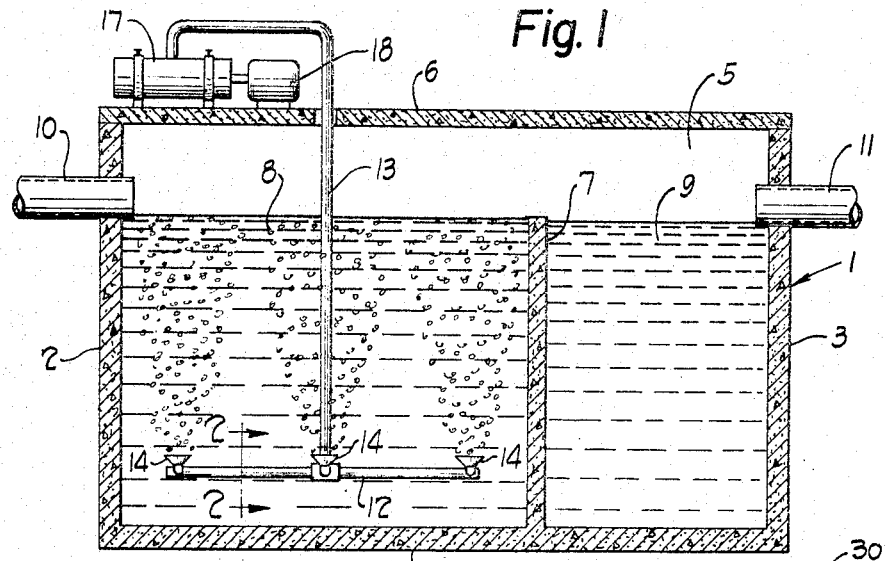
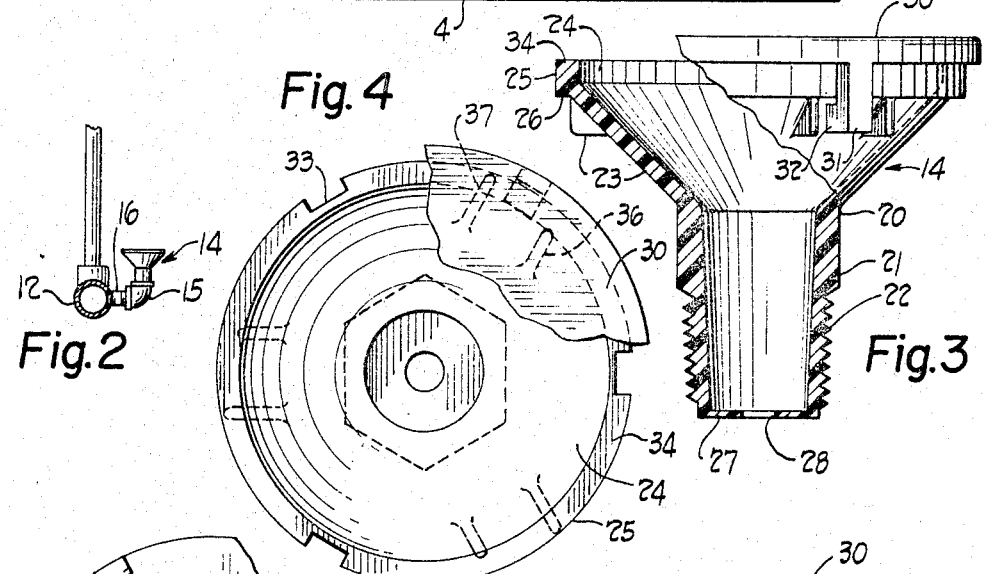
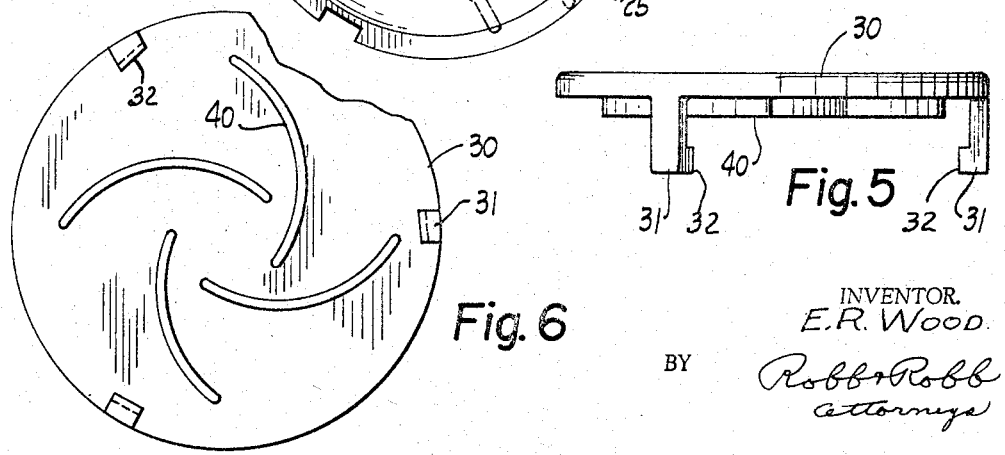
INVENTOR.
E. R. WOOD.
BY
Robb+Robb
attorneys United States Patent Office 3,276,698
Patented Oct. 4, 1966

3,276,698
COMBINATION VALVE AND DIFFUSER UNIT
Elmer R. Wood, 8666 Broadview Road,
Cleveland, Ohio
Filed Feb. 18, 1964, Ser. No. 345,665
6 Claims. (Cl. 239—452)

This invention relates to means for treatment of sewage and a method for improving such treatment.

While it has been known in the art that the introduction of air into a sewage mass, when the sewage is deposited in a storage tank such a septic tank or the like, will improve the aerobic action, and in fact speed up such action, the introduction of air alone is not always as satisfactory as it might otherwise be, and by this invention has been substantially improved over prior known means and methods therefor.

While the means and method hereof are particularly adapted to sewage treatment in septic tanks, it is likewise found to be a definite improvement in the treatment of grease or other waste products such as would pass through a grease separator or the like.

With the foregoing in mind therefore, it is a principal object of this invention to provide a novel sewage treatment method, which involves the introduction of air into a sewage mass, in such a manner that the air follows a turbulent or swirling path and thereby the bubbles of air are broken into finer portions whereby the aerobic action is substantially speeded up and improved.

It is another object of this invention to provide a novel diffuser which is capable of causing the introduction of air into the sewage mass in a manner to effect the spiral or swirling action sought and similarly disperse the air over a larger area in smaller particles or smaller portions to carry out the improved aerobic action thereby.

Another object of the invention is to provide a special type of diffuser in which a portion through which the air is initially produced, is connected to a further section which will distribute the air over a wider area, the section including a member to close the same and permit the same to be opened under pressure, and incorporating therein the means to effect the swirling or turbulent action of the air, while acting as a closure when the air is turned off or not desired to be introduced into the sewage mass.

Another object of the invention is to provide a specifically novel form of diffuser unit, in which an orifice is provided whereby varying quantities of air may be introduced into sewage masses in accordance with a predetermined basis therefor, or the amount of air may be increased where sewage concentrate is increased subsequent to an initial installation or alternatively the amount of air to be introduced is regulated by such an orifice and in conjunction with the means for opening and closing the outlet of the diffuser causes the air to follow the swirling or turbulent path sought to improve the action.

Other and further objects of the invention will be understood from a consideration of the specification appended hereto and disclosed in the drawing wherein:

FIGURE 1 is a vertical sectional view through a septic tank or other sewage storage and disposal unit, illustrating the arrangement of the aerating portion thereof.

FIGURE 2 is a fragmentary sectional view taken about on the line 2—2 of FIGURE 1 looking in the direction of the arrows.

FIGURE 3 is a fragmentary sectional view showing the diffuser unit in enlarged form and the relation of the various elements thereof.

FIGURE 4 is a plan view and showing a fragment of the closure member of the diffuser unit in place thereon.

FIGURE 5 is a side view of the closure member used for the diffuser unit of FIGURES 3 and 4.

FIGURE 6 is a bottom view of the closure member shown in FIGURE 5.

Referring to FIGURE 1, there is shown a tank generally denoted 1 of any preferred form, in this particular instance being shown as being of rectilinear configuration with the usual end walls 2 and 3, a bottom wall 4, a side wall 5 with the corresponding opposite wall thereof having been removed to disclose the parts being described, and a top 6 which is removable in the usual manner or which may have a removable section in any event for access into the interior of the tank 1.

A suitable baffle 7 within the tank divides the same into a receiving section 8 and an outlet section 9, the receiving section 8 accepting the sewage introduced thereinto from an inflow line 10, an outflow line 11 being provided for the section 9.

As shown in the figure, a manifold 12 is provided arranged near the bottom 4 of the tank, this manifold 12 extending in both directions from a supply line 13 by which the manifold 12 is supported, the manifold 12 including a series of diffuser units such as 14 connected thereto.

As illustrated in FIGURE 2 the units 14 extend upwardly from an elbow 15 which is in turn connected by a nipple 16 to the manifold 12, the manifold 12 obviously supplying air to the diffuser units 14 in a manner to be particularly described hereinafter.

The supply line 13 is connected to any suitable source of air such as the pump 17 which may be operated by a suitable electric motor such as 18, the pump 17 preferably supplying the air to the manifold at about twelve pounds per square inch.

Turning now to a consideration of the actual construction of the diffuser units 14, and in this connection it should be noted that one or more may be used, depending upon the size of the tank or portion thereof in which the aeration is desired to be effected, FIGURE 3 being particularly referred to initially.

As illustrated in FIGURE 3, the diffuser unit 14 consists of a body 20 having a portion 21 of generally cylindrical nature at the lower end of which are threads 22 for connection to an elbow such as 15.

At the upper end of the cylindrical portion 21, and formed integrally therewith is an outwardly diverging section 23 integrally formed with the portion 21 and terminating in an outlet 24.

The outlet 24 lying at the extremity of the diverging section 23 is defined by a flange 25 having a shoulder 26 therefor, this flange 25 being a peripheral flange and extending around the outlet 24.

At the lower end of the outlet section 23 is an orifice member 27, in which an orifice 28 is formed. The orifice member 27 comprises a sort of diaphragm-like portion and the orifice 28 may be enlarged in any suitable manner in accordance with the amount of air to be directed through the outlet 24.

A suitable combination cover and valve means 30 is provided, and as illustrated in FIGURES 5 and 6 consists of a round flat member of any preferred thickness, from which extend downwardly a series of arms 31, in this particular instance there being three of such arms, which are in turn equipped with an inwardly extending lock portion 32.

In view of the fact that the cover 30 may preferably be formed of a suitable plastic material and the body 20 likewise similarly formed, it will be apparent that the arms 31 will thereby be somewhat flexible or at least sufficiently resilient to permit their temporary and momentary distortion as they are introduced into engagement with the flange 25 and specifically with suitable notches 33 formed therein, so that the cover 30 may be emplaced on and seat against the surface 34 at the outlet 24 and specifically on the flange 25.

As will be noted from a consideration of FIGURE 4 particularly, pairs of lugs 36 and 37 are positioned at 120 degree intervals on the outer surface of the outlet section 23 and extend downwardly therefrom about as illustrated in FIGURE 3, one of the lugs, specifically the lug 36 in each instance, being of somewhat less maximum outward extension than the lug 37 in each case.

The purpose of these lugs 36 and 37 as spaced, is to compel the retention of the cover 30 after the arms 31 have been introduced into the notches 33, so that the portions 32 thereof upon rotation in a counterclockwise direction, will pass beneath the flange 25 and specifically the surface 26 thereof, sufficient rotation of the cover 30 causing the portions 32 to pass by the lugs 36. Since the portions 32 extend sufficiently inwardly as respects the lugs 36, it is necessary that a slight distortion of the arms 31 take place to facilitate the positioning of the arms in the position shown in FIGURE 4 after which the cover is retained by these lugs against rotation in any direction which would cause the cover to be moved to a position to permit the portions 32 to pass upwardly from the notches 33.

It will thus be apparent that the cover once emplaced on and rotated so as to cause the interengagement of the lugs 36 and 37 or at least the positioning of the arms 31 with respect to the lugs 36 and 37 so that the cover can only move slightly and yet freely be permitted to move upwardly and downwardly a limited distance as regulated by the position of the portion 32 with respect to the shoulder 26 of the flange 25.

It will thus be understood that the cover 30 is susceptible of some vertical movement within limits and if necessary can even be removed, by slight distortion of the arms 31 so as to permit them to be rotated clockwise past the lugs 36 until they are aligned with the notches 33 subsequent withdrawal of the cover being thereby possible as will be apparent.

Since the cover is permitted to move upwardly and downwardly slightly, and thereby permit the passage of air out beneath the cover in what may be termed a sort of layer, the air might normally be permitted to escape in what might be termed blobs or slugs, and thereby the aeration and aerobic action may not be as effective as desirable. To the foregoing end therefore, the cover 30 is provided with suitable vanes 40 arranged on the undersurface thereof as illustrated in FIGURES 5 and 6, so that as the air in passing through the orifice 28 impinges thereagainst, that is against the lower side of the cover, and in so doing raises the cover 30 a limited distance, depending upon the air pressure and the location of the portions 32 on the arms 31 of the cover, the air will pass outwardly through the opening provided thereby in a swirling or spiral manner as caused by the blades 40.

The spiral action not only prevents the air from passing in slugs or blobs but the blades have a tendency to break up the air into much smaller bubbles and thus the aerobic action is substantially enhanced thereby.

It is of course apparent that the blades 40 may be arranged in any suitable manner, so as to effect the action heretofore described and any number of blades supplied to effect the desirable distribution and action of the air in the sewage mass.

When the air is shut off as it may periodically be, the weight of the liquid on the cover 30 will cause the same to move downwardly and close the outlet end by seating on the seat 34 provided. The air pressure when introduced into the diffuser units heretofore described causes the cover to move upwardly and downwardly within the limits described and permitted by the regulation of such air.

It will be apparent that any suitable number of these diffuser units may be provided, and air pressures varied, quantity of air likewise varied as by the orifice size in each diffuser unit, it also being possible to have air in greater quantities at different positions within any given tank and from any manifold by regulation of the orifice size in each diffuser unit.

It is emphasized that the diffuser unit 14 and its parts are preferably formed of a suitable inert plastic, which is not affected by the sewage in an unfavorable manner, and that the action of the diffuser unit 14 in opening and closing is properly effected because of the type of plastic which may be used and the facilitatiing of the seating action of the cover so as to prevent the movement of the sewage into the diffuser unit itself.

It has been found that certain plastics are more suitable than others to use as the material from which the parts are molded. As an example, nylon has been used with satisfactory results. Other plastics tried were not desirable because of the wear which resulted in use occasioned by a sort of fluttering action which the cover 30 undergoes. This also had a tendency to develop wear at the flange 25, which is overcome by the use of nylon, or at least such wear is virtually eliminated.

I claim:

1. A combination valve and diffuser unit comprising a body having a portion to connect the same to a supply of pressurized air, an outlet end for said body, air control valve means at said end movable between open and closed positions in response to said air supply pressure controlling discharge of air therefrom and comprising elements for imparting a swirling motion thereto over a relatively wide area, and lock means on said air control valve means engaged with the body for limiting movement of said air control valve means.

2. A unit as claimed in claim 1, wherein the air control valve means comprises a cap member movable between positions in response to changes in air pressure, said cap member including vane portions arranged on the underside thereof to impart the swirling motion aforesaid.

3. A unit as claimed in claim 1, wherein the outlet end of the body consists of an outwardly diverging section, a control valve member seated at the extremity of said section, said control valve member being movable toward and away from said extremity in response to air supply pressure, said control valve member including vane portions on its underside to direct air directed thereagainst, outwardly of said body with the swirling motion stated.

4. A unit as claimed in claim 3, wherein means defining an orifice is formed in said body intermediate the portion connected to the supply of pressurized air and the extremity of said diverging section, said orifice being susceptible of change in area.

5. A combination valve and diffuser unit comprising a body having a lower generally cylindrical portion, means to connect said portion to a supply of pressurized air, an upper inverted generally conical section defining an outlet, a closure valve member for said outlet, said valve member having limited movement toward and away from said outlet in response to said supply of pressurized air, means on the closure valve member to impart a swirling motion to air passing through the outlet to be discharged in a turbulent manner, means defining a variable sized orifice positioned between the lower portion and upper section, flange means around said outlet, and means on said closure valve member engageable with said flange to control movement of said closure valve member.

6. A unit as claimed in claim 5, wherein the dispersal means consist of arcuate radially extending vanes formed on the underside of the control valve member, which are impinged by air passing therealong.

References Cited by the Examiner

UNITED STATES PATENTS

| | | | |
|---|---|---|---|
| 850,216 | 4/1907 | Dornfeld | 239—486 |
| 1,214,229 | 1/1917 | Sharpe | 261—123 |
| 1,459,012 | 6/1923 | Brauer | 239—486 X |
| 1,583,141 | 5/1926 | Greenawalt | 261—124 |
| 1,605,325 | 11/1926 | Borgeson | 239—486 X |
| 2,550,100 | 4/1951 | Voss | 239—571 X |
| 2,616,676 | 11/1952 | Walker | 261—124 |
| 2,733,103 | 1/1956 | Laster et al. | 239—486 |
| 3,048,339 | 8/1962 | Tapleshay | 239—571 |
| 3,153,682 | 10/1964 | Walker | 261—124 |
| 3,182,978 | 5/1965 | Reilly | 261—124 |

FOREIGN PATENTS 1,247,573  10/1960  France.

MORRIS O. WOLK, *Primary Examiner.*

M. E. ROGERS, *Assistant Examiner.*